United States Patent
Goh et al.

(10) Patent No.: US 12,054,154 B2
(45) Date of Patent: Aug. 6, 2024

(54) SYSTEMS AND METHODS FOR SKID RECOVERY USING FRONT WHEEL SLIP

(71) Applicant: Toyota Research Institute, Inc., Los Altos, CA (US)

(72) Inventors: Yan Ming Jonathan Goh, Palo Alto, CA (US); John Subosits, Menlo Park, CA (US); Michael Thompson, San Juan Capistrano, CA (US); Alexander R. Green, Redwood City, CA (US); Avinash Balachandran, Sunnyvale, CA (US); Hanh Nguyen, Morgan Hill, CA (US)

(73) Assignee: Toyota Research Institute, Inc., Plano, TX (US)

( * ) Notice: Subject to any disclaimer, the term of this patent is extended or adjusted under 35 U.S.C. 154(b) by 220 days.

(21) Appl. No.: 17/329,443

(22) Filed: May 25, 2021

(65) Prior Publication Data
US 2022/0379895 A1    Dec. 1, 2022

(51) Int. Cl.
  *B60W 30/18*   (2012.01)
  *B60W 30/09*   (2012.01)
(52) U.S. Cl.
  CPC ...... *B60W 30/18172* (2013.01); *B60W 30/09* (2013.01); *B60W 2552/40* (2020.02); *B60W 2720/20* (2013.01); *B60W 2720/263* (2013.01); *B60W 2720/28* (2013.01)
(58) Field of Classification Search
  CPC .......... B60W 30/18172; B60W 30/09; B60W 2552/40; B60W 2720/20; B60W 2720/263; B60W 2720/28
  USPC ........................................................ 701/75
  See application file for complete search history.

(56) References Cited

U.S. PATENT DOCUMENTS

| | | | |
|---|---|---|---|
| 5,282,138 A | 1/1994 | Sano | |
| 6,453,228 B1 | 9/2002 | Shimada | |
| 7,125,086 B2 | 10/2006 | Tanaka et al. | |
| 7,444,222 B2 * | 10/2008 | Villella | B60W 10/16 |
| | | | 701/88 |
| 7,444,223 B2 | 10/2008 | Thumrugoti | |

(Continued)

FOREIGN PATENT DOCUMENTS

| | | | | |
|---|---|---|---|---|
| CN | 104773169 B | * | 5/2017 | .......... B60W 10/184 |
| JP | 2015150953 A | * | 8/2015 | |

OTHER PUBLICATIONS

Gao, Yiqi, Model Predictive Control for Autonomous and Semiautonomous Vehicles, 2014, UC Berkeley Electronic Theses and Dissertations, pp. 14-15 (Year: 2014).*

(Continued)

*Primary Examiner* — Elaine Gort
*Assistant Examiner* — Christopher R Cardimino
(74) *Attorney, Agent, or Firm* — Christopher G. Darrow; Darrow Mustafa PC

(57) ABSTRACT

System, methods, and other embodiments described herein relate to skid recovery for a vehicle. In one embodiment, a method for controlling a vehicle during skid includes obtaining data indicating a skid condition of the vehicle, determining whether the skid condition can be corrected by counter-steering, and executing an intervention when the skid condition cannot be corrected by counter-steering, the intervention including inducing slippage in front wheels of the vehicle to change a direction and/or magnitude of lateral forces at the front wheels.

21 Claims, 8 Drawing Sheets

(56) References Cited

U.S. PATENT DOCUMENTS

| | | | |
|---|---|---|---|
| 7,451,032 B2 | 11/2008 | Brown et al. | |
| 8,000,872 B2* | 8/2011 | Song | B60T 8/17616 |
| | | | 701/71 |
| 8,725,310 B2 | 5/2014 | Han | |
| 9,187,121 B2* | 11/2015 | Gerecke | B62D 7/159 |
| 9,975,537 B2 | 5/2018 | Yanagida et al. | |
| 10,029,679 B2* | 7/2018 | Nava | B60W 30/045 |
| 10,503,172 B2* | 12/2019 | Englard | G05D 1/0221 |
| 11,186,286 B2* | 11/2021 | Yi | B60W 40/068 |
| 2008/0059034 A1 | 3/2008 | Lu | |
| 2015/0224989 A1 | 8/2015 | Fairgrieve et al. | |
| 2015/0239442 A1 | 8/2015 | Yamakado et al. | |
| 2021/0001859 A1* | 1/2021 | Nishiura | B60T 8/1755 |

OTHER PUBLICATIONS

Tavernini, D., Velenis, E., Lot, R., and Massaro, M. (Apr. 15, 2014), "The Optimality of the Handbrake Cornering Technique," ASME. J. Dyn. Sys., Meas., Control, Jul. 2014; 136(4): 041019 (abstract).

Velenis et al. "Modeling Aggressive Maneuvers on Loose Surfaces: The Cases of Trail-Braking and Pendulum-Turn," 2007 European Control Conference (ECC), Kos, 2007, pp. 1233-1240, doi: 10.23919/ECC.2007.7068670.

Chakraborty et al. "Vehicle Posture Control Through Aggressive Maneuvering for Mitigation of T-bone Collisions," In Decision and Control and European Control Conference (CDC-ECC), 2011 50th IEEE Conference on, pp. 3264-3269, Dec. 2011.

\* cited by examiner

SYSTEMS AND METHODS FOR SKID RECOVERY USING FRONT WHEEL SLIP

TECHNICAL FIELD

The subject matter described herein relates, in general, to systems and methods for improving skid recovery of a vehicle, and more particularly, to a skid recovery system that can control wheel speed to induce slippage in front wheels of the vehicle to change a direction and/or magnitude of lateral forces at the front wheels and thereby improve skid recovery.

BACKGROUND

Side-slip is the angle between the vehicle's body and the direction of motion. In typical driving scenarios, side-slip is small, on the order of a few degrees. However, certain scenarios can cause side-slip to rapidly increase. One example of this is when the friction limits in the rear-axle are exceeded due to driving over a slippery surface such as patch of ice or snow. When this occurs the vehicle is often described as being in a spin or skid during side-slip. For relatively minor skids, where the side-slip angle magnitude is comparable to the maximum steering angle, the operator can "counter-steer" or "steer-into-the-skid" to straighten out the vehicle. When side-slip is significantly greater than the max steering angle, however, counter-steering is not effective and the vehicle is at risk of entering an dangerous spin condition beyond the operator's ability to control or recover from.

SUMMARY

The disclosed systems and methods provide enhanced skid recovery when a vehicle side-slip is significantly greater than a max steering angle and/or counter-steering by the operator is ineffective in achieving skid recovery. The disclosed systems and methods may redirect or reduce the front lateral force by sliding front tires of the vehicle and using a friction circle coupling effect.

In one embodiment, a skid recovery system includes a sensor to generate sensor data indicating one or more aspects of a skid condition of the vehicle. The skid recovery system further includes a processor and a memory, communicably connected to the one or more processors, storing a detection module including instructions that, when executed by the processor, cause the processor to determine whether the skid condition can be corrected by counter-steering, and an intervention module including instructions that, when executed by the processor, cause the processor to execute an intervention when the detection module determines that the skid condition cannot be corrected by counter-steering, the intervention including inducing slippage in front wheels of the vehicle to change a direction and/or magnitude of lateral forces at the front wheels.

In another embodiment, a method of controlling a vehicle to improve skid recovery includes obtaining data indicating a skid condition of the vehicle, determining whether the skid condition can be corrected by counter-steering, and executing an intervention when the skid condition cannot be corrected by counter-steering, the intervention including inducing slippage in front wheels of the vehicle to change a direction and/or magnitude of lateral forces at the front wheels.

In another embodiment, a non-transitory computer-readable medium for controlling a vehicle during a skid to improve skid recovery includes instructions that, when executed by one or more processors, cause the one or more processors to obtain data indicating a skid condition of the vehicle, determine whether the skid condition can be corrected by counter-steering, and execute an intervention when the skid condition cannot be corrected by counter-steering, the intervention including inducing slippage in front wheels of the vehicle to change a direction and/or magnitude of lateral forces at the front wheels.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and embodiments associated with controlling a vehicle to execute a skid recovery are disclosed. In one or more embodiments, the disclosed embodiments can control one or more vehicle systems, such as the brakes and/or throttle, to apply positive or negative to reduce lateral forces on front tires of a vehicle and recover from a skid which has progressed to a point at which counter-steering may be ineffective. Such a state may be referred to herein as "spin with insufficient counter steer."

Conventional anti-lock braking systems (ABS) and electronic stability control (ESC) systems commonly attempt to assist in vehicle skid recovery by attempting to limit operation of vehicle tires to a so-called 'free-rolling region,' i.e., a state in which the tires continue to spin. For example, when an operator applies brakes during a skid, the ABS can supersede the braking effect by modulating and limiting actual applied brake pressure to prevent the tires from locking up. However, a side effect of this technique is that the ABS does not alter lateral force from the tire. Similarly, conventional ESC systems generally implement techniques that modify longitudinal force, not lateral force.

When a tire does lock up, the tire enters a so-called 'sliding region' of operation, often referred to as 'saturated.' In the saturated region, the longitudinal forces are coupled with the tire forces. The friction circle is a simple model for this coupling, in which the total vector sum of longitudinal and lateral force is limited to the maximum friction force. In this region of operation, increasing a magnitude of the longitudinal force (e.g., through additional braking) decreases lateral force. When side-slip is too great to be addressed by the maximum steering angle and/or countersteering by the operator is ineffective in achieving skid recovery, the disclosed systems and methods may reduce the front lateral force by intentionally sliding the front tires and using the friction circle coupling effect.

Accordingly, the disclosed systems and methods can generally: 1) read data from sensor measurements, including yaw rate, side-slip, wheel-speeds, steering angle, to measure side-slip and determine if the vehicle is in a large angle skid, 2) compute, according to overall capabilities of the brakes and engine of the vehicle, how much positive or negative slip could be applied to the front wheels, and whether the technique should be used in this situation, and 3) in response to the above decision, determine how much positive or negative slip to apply, according to current conditions and programmed parameters of operation. The disclosed systems and methods can execute the determined positive or negative slip by applying braking or drive torque as required.

Figure 1:
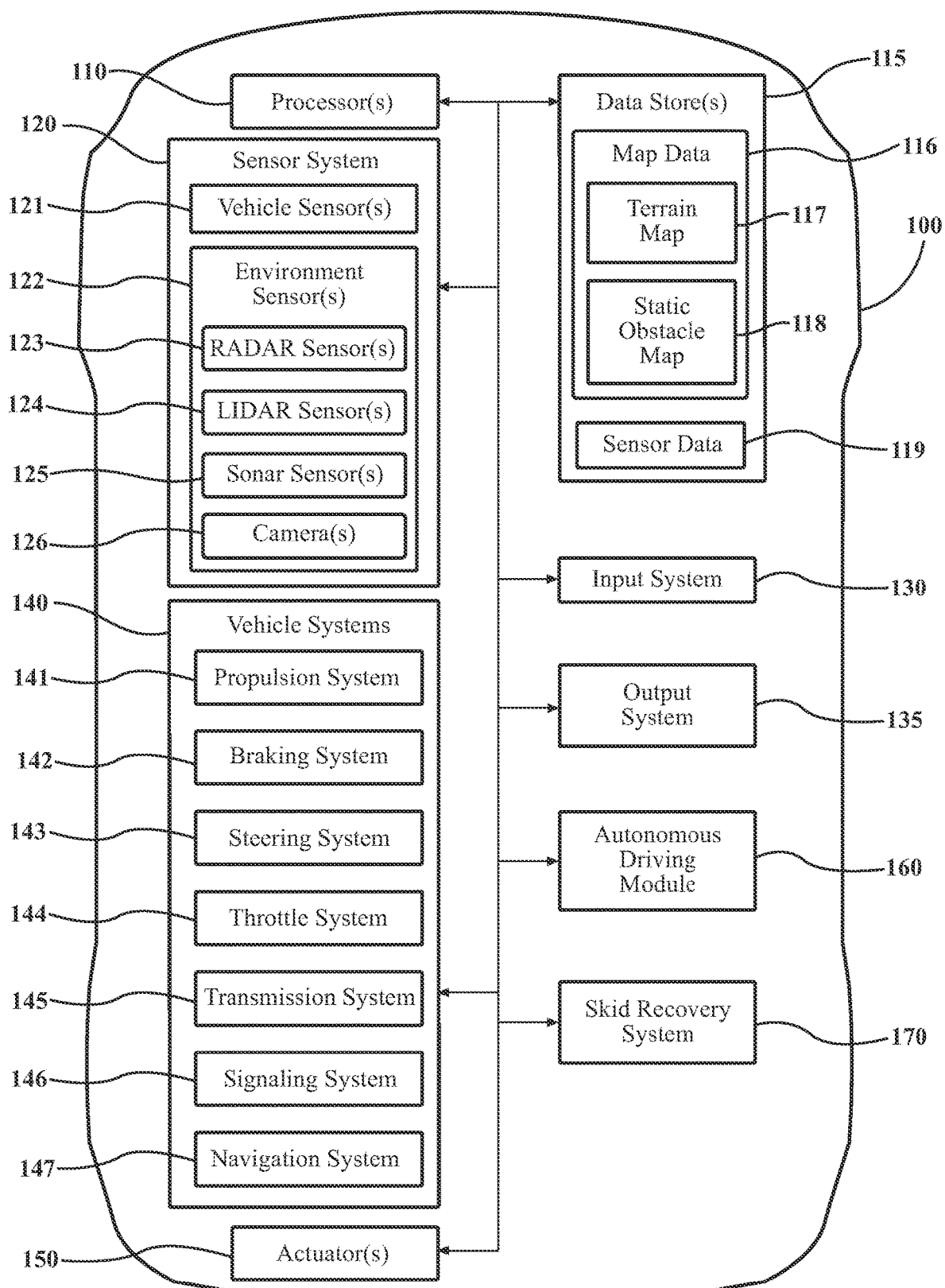
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is a front-wheel drive automobile. While arrangements will be described herein with respect to automobiles, it will be understood that embodiments are not limited to automobiles. In some implementations, the vehicle 100 may be any form of powered, multi-wheeled transport or vehicle that can benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-4, 5A, 5B, 5C, 6 and 7 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a skid recovery system 170 that functions to automatically analyze sensor data to identify a skid condition and execute positive or negative slip by applying braking or drive torque as required to cause the vehicle 100 to exit or reduce the skid condition and recover directional control. Moreover, while depicted as a standalone component, in one or more embodiments, the skid recovery system 170 can be integrated with another component of the vehicle 100, such as the autonomous driving module 160 or other drive control system of the vehicle 100. The noted functions and methods will become more apparent in the following discussion of the figures.

As will also be discussed further below, the vehicle 100 includes one or more environment sensors 122, and various vehicle systems 140 including a braking system 142 and a throttle system 144. In one or more embodiments, the skid recovery system 170 can control one or more of the vehicle systems 140 to apply positive or negative slip to the front tires to aid in recovering from a skid condition.

Figure 2:
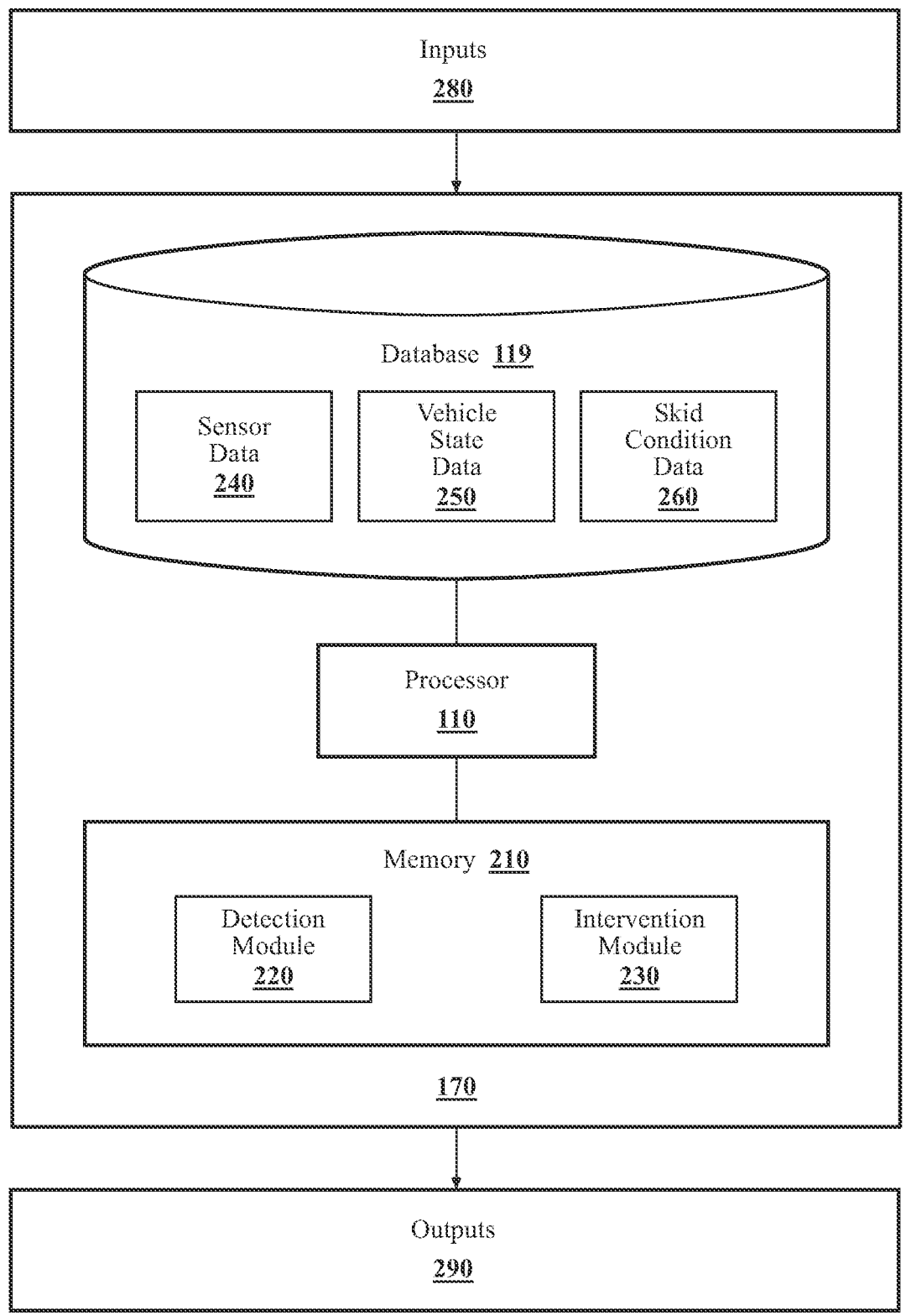
FIG. 2 illustrates one embodiment of a skid recovery system according to the disclosed embodiments.

With reference to FIG. 2, one embodiment of the skid recovery system 170 of FIG. 1 is illustrated. The skid recovery system 170 is shown as including a processor 110 and database 119 from the vehicle 100 of FIG. 1. Accordingly, the processor 110 may be a part of the skid recovery system 170, the skid recovery system 170 may include a processor separate from the processor 110 of the vehicle 100 or the skid recovery system 170 may access the processor 110 through a data bus or another communication path.

The skid recovery system 170 includes a database 119 that stores, among other things, sensor data 240 (e.g., data received from the environment sensors 122), vehicle state data 250 (e.g., data received from one or more vehicle systems 140, such as the steering system 143, throttle system 144, and transmission system 145 indicating a vehicle state) and skid condition data 260 (e.g., data that indicates one or more aspects of a turning event of the vehicle 100), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220 and 230. The database 119 is configured with routines that can be executed by the processor 110 for analyzing stored data, providing stored data, organizing stored data, and so on. Thus, in one embodiment, the database 119 stores data described above (as well as other data) used by the modules 220 and 230 in executing various functions.

Additionally, the skid recovery system 170, in one or more embodiments, includes a memory 210 that stores a detection module 220 and an intervention module 230. The memory 210 can be constructed as a random-access memory (RAM), read-only memory (ROM), a hard-disk drive, a flash memory, or other suitable memory for storing the modules 220 and 230. The modules 220 and 230 are, for example, constructed as computer-readable instructions that when executed by the processor 110 cause the processor 110 to perform the various functions disclosed herein.

The skid recovery system 170 can receive various inputs 280 and process and/or store the inputs 280, for example, as sensor data 240 and vehicle state data 250. The skid recovery system 170 can generate outputs 290, for example, actuation commands to the throttle system 144 and transmission system 145.

The detection module 220 is generally constructed including instructions that function to control the processor 110 to obtain data and determine, based on the data, whether the vehicle 100 is in a skid condition that can be corrected by current applied value of counter-steering. For example, in one or more embodiments the detection module 220 can generate the skid condition data 260, based in part on sensor data 240 and/or vehicle state data 250, that indicates various aspects of a skid condition of the vehicle 100, as will be discussed further below.

The intervention module 230 is generally constructed including instructions that function to control the processor 110 to execute an intervention when the detection module 220 determines that the vehicle 100 is in a skid condition that cannot be corrected by counter-steering. As will be discussed further below, the intervention can include inducing slippage in front wheels of the vehicle to change a direction and/or magnitude of lateral forces at the front wheels.

Figure 3:
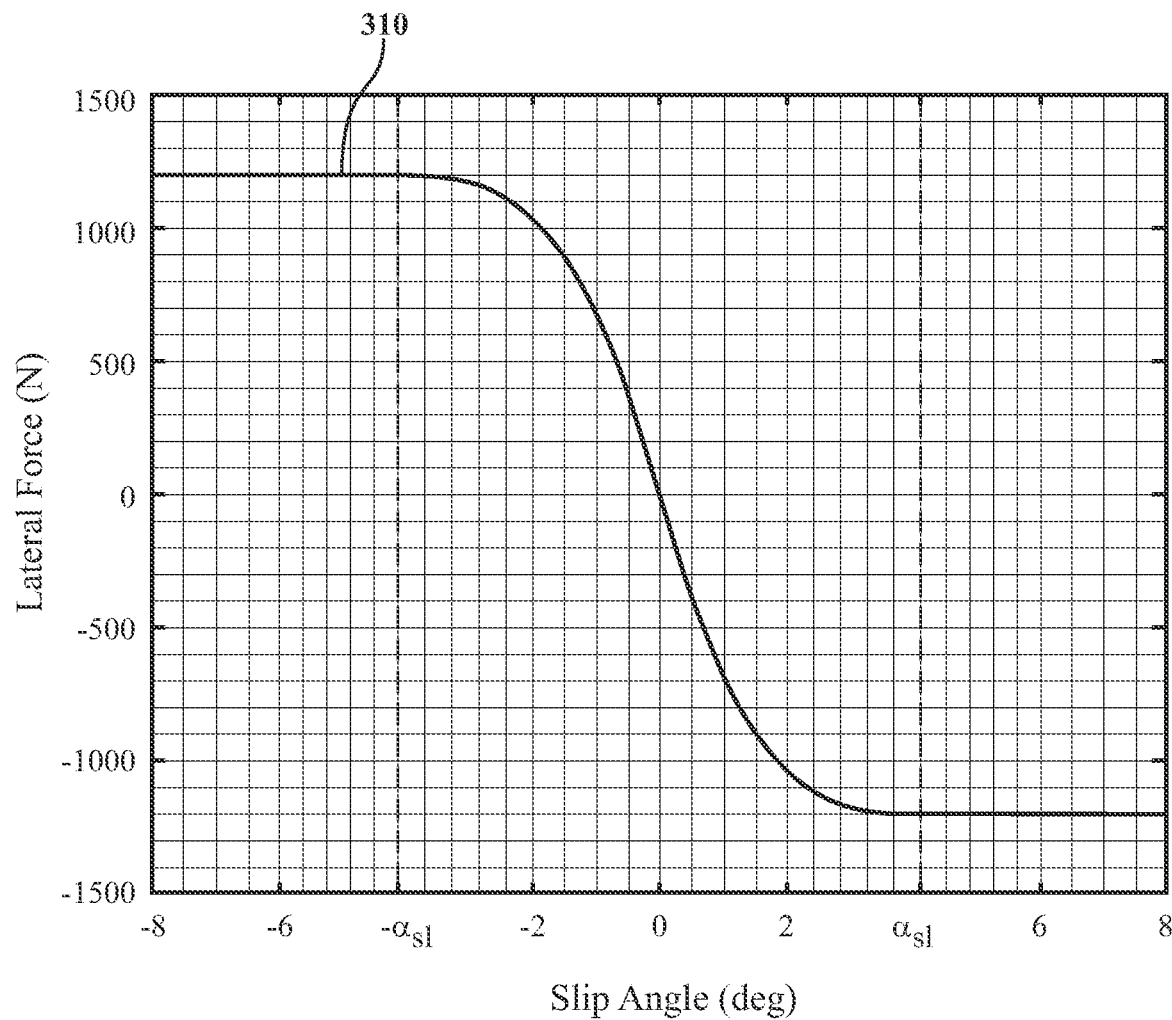
FIG. 3 illustrates an example graph of a tire force curve according to the disclosed embodiments.

FIG. 3 illustrates an example graph 300 of a tire force curve 310, showing lateral force on the y-axis and slip angle on the x-axis. While there are many models for the relationship between lateral force and slip angle, generally accepted models agree on the concept that beyond some critical slip angle (denoted in graph 300 as $\alpha_{sl}$) the lateral force from the tire saturates. That is, the curve 310 becomes either flat or close to flat beyond the critical slip angle $\alpha_{sl}$ as opposed to the behavior at smaller slip angles, where tire force increases rapidly inversely proportional to slip angle.

Figure 4:
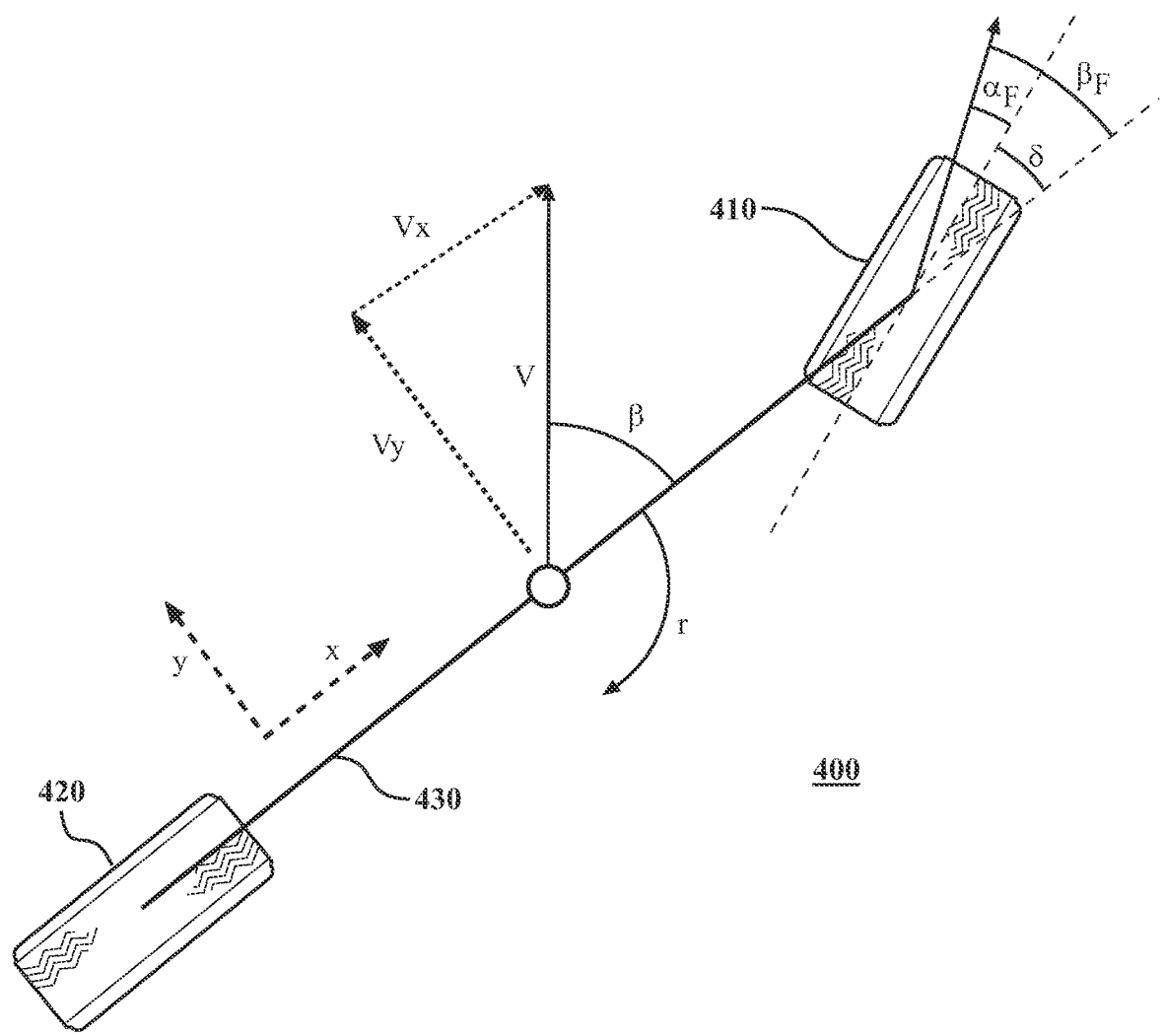
FIG. 4 illustrates an example of a single-track model of a vehicle in a spin with insufficient counter steer situation and no intervention, according to the disclosed embodiments.

FIG. 4 depicts a single-track model 400 (e.g., of vehicle 100) in a spin with insufficient counter steer situation, with no intervention. The single-track model 400, i.e., depicting a single front tire 410 and rear tire 420 disposed on a body 430, is used here merely for simplicity of explanation; the vehicle 100 includes four tires as shown in FIG. 1. One of ordinary skill in the art can understand and apply the concepts disclosed herein based on the single-track model 400 to a model with four (or another number of) tires.

An x-axis is shown parallel with the body 430 of the vehicle 100 and a y-axis is shown perpendicular to the left of the body 430 of the vehicle 100. The center-of-gravity of the vehicle 100 is moving with velocity V, which has components $V_y$ and $V_x$, along the y-axis and x-axis respectively. Angles in this frame are positive in rotation from x into y.

The sideslip $\beta$ of the vehicle 100 can be defined as:

$$\beta = a\tan(V_y/V_x) \qquad \text{Eq. 1}$$

In the example scenario illustrated in FIG. 4 the vehicle 100 is rotating at a yaw rate r, where r is negative and $\beta$ is positive. In this case, the vehicle 100 has been oversteered (e.g., during a right-hand turn) resulting in the vehicle 100 slipping into a skid state.

The front wheel is steered at a steering angle $\delta$ from the vehicle 100 centerline. In this example situation, $\delta$ is positive. For the single-track model 400, the sideslip angle $\beta_F$ between the velocity vector at the front tire 410 and the centerline can be defined as:

$$\beta_F = \frac{V_y + ar}{V_x} \qquad \text{Eq. 2}$$

It should be understood that Equation 2 would be different for a four-wheel model but trivial to calculate for one of ordinary skill in the art. The front tire 410 slip angle $\alpha_f$ can be defined as the difference between the sideslip angle $\beta_F$ and the steering angle $\delta$ at the front tire 410:

$$\alpha_f = \beta_F - \delta \qquad \text{Eq. 3}$$

When the vehicle 100 is in a skid with high sideslip, sideslip angle $\beta_F$ is high. For a force from the front tire 410 to counteract the skid, the force should point in a direction that will reduce the magnitude of vehicle sideslip. For example, in the scenario illustrated in FIG. 4 the force from the front tire 410 should point to the left to correct the skid. Such a corrective force would correspond to the front tire 410 slip angle $\alpha_f$ being negative, that is, pointing to the right of the y-axis.

Application of the corrective force can, in some instances, be accomplished through counter-steering, i.e., by increasing the steering angle $\delta$. However, in some situations counter-steering is insufficient to correct the skid, e.g., due to operator action (autonomous stack decision, human driver not counter-steering enough, etc.) or other reasons such as hitting a physical steering limit, etc. In any event, for the purpose of discussion such is the case in the example scenario of FIG. 4. That is, steering angle $\delta$ is not large enough to counteract the large value of sideslip angle $\beta_F$.

In this situation, the steering angle $\delta$ is so small that the tire force is saturated in an unhelpful direction regarding skid recovery. That is, the front tire 410 generates force in a direction that worsens the skid and in fact may be saturated in that direction. Hereinafter this situation will be referred to as 'spin with insufficient counter-steer'.

The skid recovery system 170 can, in some circumstances, take responsive action to recover control of the vehicle 100 when it detects the vehicle 100 in a spin with insufficient counter-steer condition. In one or more embodiments, the skid recovery system 170 can determine when to intervene in a spin with insufficient counter-steer situation based on one or more pre-defined intervention thresholds. The skid recovery system 170 can define a first intervention threshold $\text{sgn}(\beta)\alpha_f$ as being met when:

$$\text{sgn}(\beta)(\beta_F - \delta) > \text{sgn}(\beta)\alpha_{sl} \qquad \text{Eq. 4}$$

where sgn is the sign operator and is used to account for left and right turns and $\alpha_{sl}$ is a parameter with positive value that represents the slip angle at which the front tire 410 force is saturated. The parameter $\alpha_{sl}$ can be preset based on specific traits of the vehicle 100, such as tire compound, vehicle weight, etc., as well as tuned further for sensitivity, user feel, performance, etc.

The skid recovery system 170 can also use additional criteria based on other vehicle states to define intervention thresholds. In one or more embodiments, the skid recovery system 170 can define a sideslip threshold $\beta_{threshold}$, to further constrain when intervention would be used:

$$|\beta_F| - \beta_{threshold} > 0 \qquad \text{Eq. 5}$$

where $\beta_{threshold}$ is a design parameter that can vary with vehicle states.

Generally, the skid recovery system 170 can define the sideslip threshold $\beta_{threshold}$ such that when Equation 5 is true, the front tire 410 force is saturated. While conventional ESC and ABS systems attempt to prevent wheel slip, the disclosed skid recovery system 170 can instead leverage wheel slip to perform an intervention and improve skid recovery.

When a tire is fully sliding, coupling of force occurs between the longitudinal and lateral forces produced at the tire contact patch. A general model that can be used to represent this phenomenon depicts the resulting total force ($F_y$) as 'saturated' at a constant magnitude and pointed directly opposite to a relative velocity vector (i.e., velocity vector $V_{total}$) between the tire contact patch and the road.

Figure 5B:
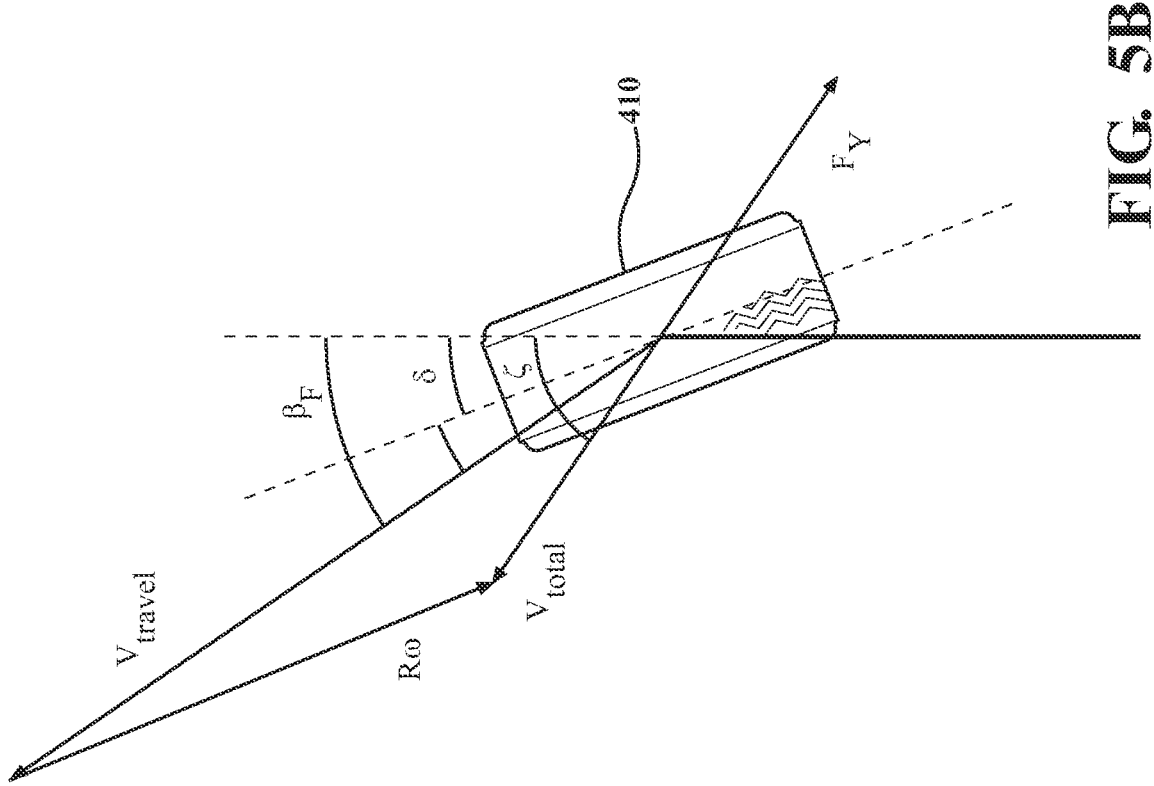
FIG. 5B illustrates an example of the results of the disclosed skid recovery system executing a negative wheel slip intervention, according to the disclosed embodiments.
Figure 5A:
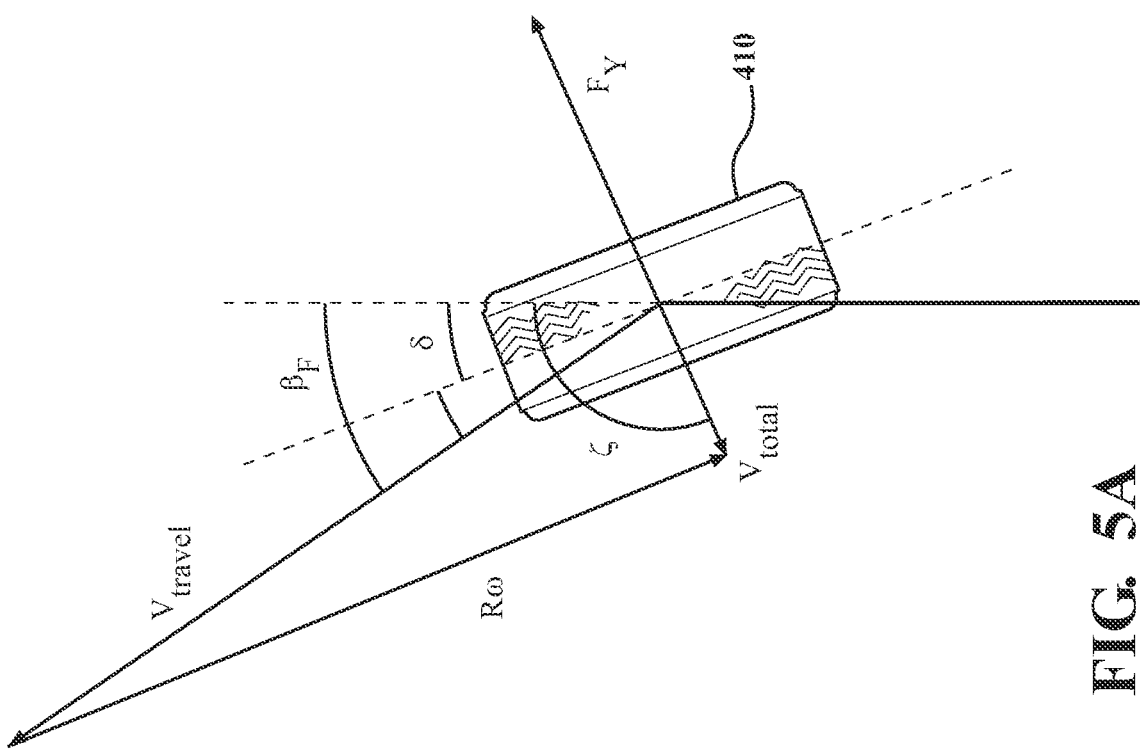
FIG. 5A illustrates an example scenario of a tire in a free-rolling state without any intervention by the disclosed skid recovery system, according to the disclosed embodiments.
Figure 5C:
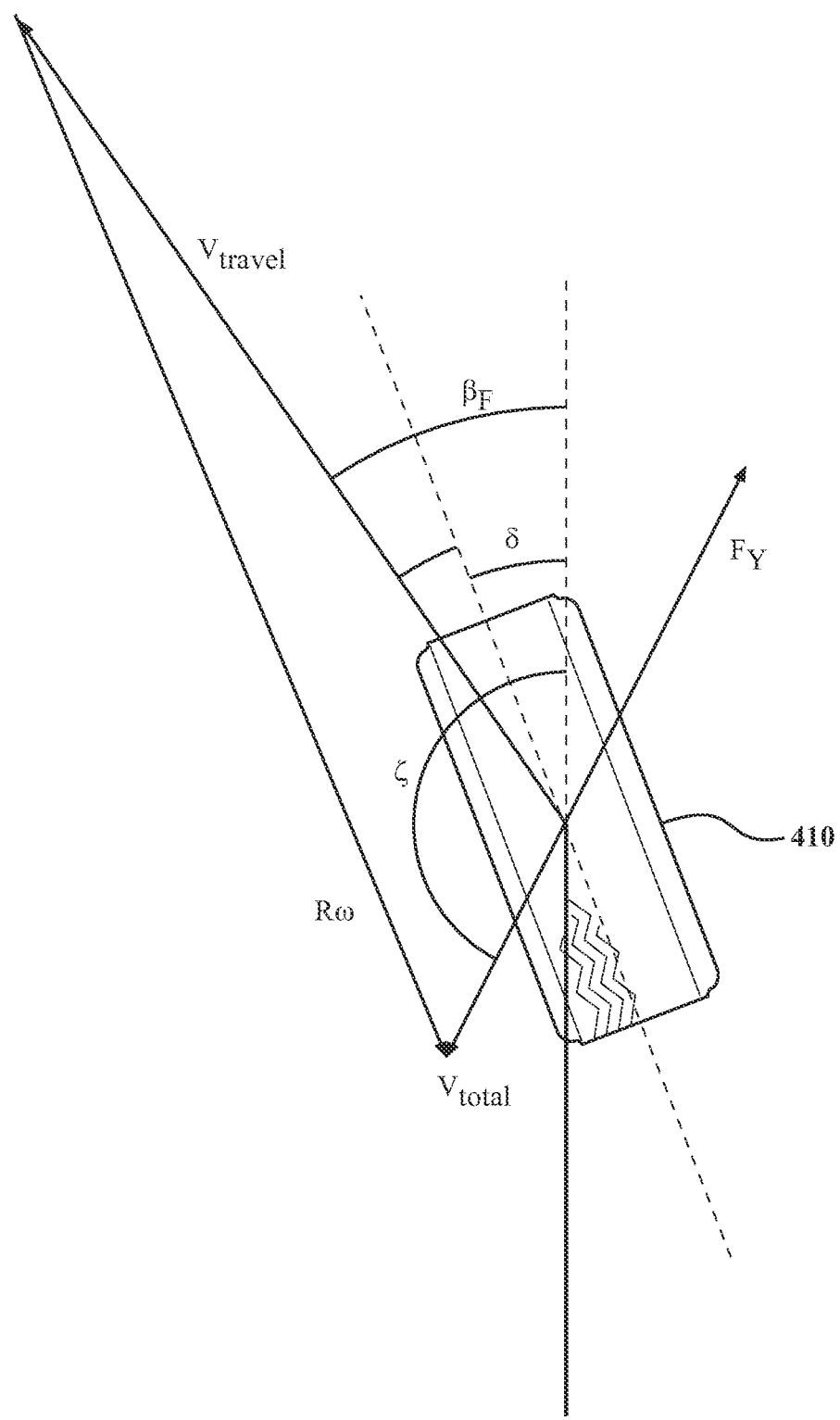
FIG. 5C illustrates an example of the results of the disclosed skid recovery system executing a positive wheel slip intervention, according to the disclosed embodiments.

FIGS. 5A-5C illustrate components of a relative velocity vector in three different situations. In one or more embodiments, to determine $V_{total}$, which the force vector $F_y$ is directly opposed to, the skid recovery system 170 can subtract the vector $R\omega$ from the vehicle body velocity $V_{travel}$ at the axle, where R is the radius of the tire and $\omega$ is the wheel speed. The skid recovery system 170 can determine and monitor an angle $\zeta$ between $V_{total}$ and the x-axis of the vehicle 100 body based on the following equation:

$$\zeta = \arctan \frac{V_{travel,y} - R\omega \sin\delta}{V_{travel,x} - R\omega \cos\delta} \qquad \text{Eq. 6}$$

where the subscripts x and y denote the components of $V_{travel}$ along the vehicle's x- and y-axes, respectively.

As shown in Equation 6, by controlling the wheel speed $\omega$ the skid recovery system 170 can control the angle $\zeta$, and thereby control a direction of the force vector $F_y$ from the tire.

FIG. 5A shows the tire 410 in a free-rolling state, i.e., without any intervention by the skid recovery system 170. The tire 410 has a wheel speed $\omega_{freerolling}$ which may be determined as:

$$\omega_{freerolling} = V_{travel,x} \cos\delta + V_{travel,y} \sin\delta \qquad \text{Eq. 7}$$

In this situation, the angle $\zeta = \zeta_0 = \pi/2 + \delta$, and the force vector $F_y$ is perpendicular to the tire.

FIG. 5B shows the results of the skid recovery system 170 executing a negative wheel slip intervention. In this type of intervention, the skid recovery system 170 can actuate brakes (or some other actuator) to lower the wheel speed $\omega$ below the free-rolling speed. The skid recovery system 170 can determine a lower bound for this intervention as corresponding with a fully locked wheel that has a wheel speed $\omega$ equal to zero. That is, in applying a negative wheel slip intervention the skid recovery system 170 can control wheel speed $\omega$ according to the following boundaries:

$$0 < \omega < \omega_{freerolling} \qquad \text{Eq. 8}$$

In addition, in implementing a negative wheel slip intervention the skid recovery system 170 can determine corresponding angle $\zeta$ limits associated with control of the wheel speed $\omega$ as:

$$\text{sgn}(\beta_F)\beta_F < \text{sgn}(\beta_F)\zeta < \text{sgn}(\beta_F)\zeta_0 \qquad \text{Eq. 9}$$

where the sign operator sgn is used to account for both left and right turn conditions.

Next, FIG. 5C shows the results of the skid recovery system 170 executing a positive wheel slip intervention. Using drive torque or some other actuator, the skid recovery system 170 increases the wheel speed above the free-rolling speed. That is, in applying a positive wheel slip intervention the skid recovery system 170 can control wheel speed $\omega$ according to the following boundaries:

$$\omega_{freerolling} < \omega < \omega_{max} \qquad \text{Eq. 10}$$

where $\omega_{max}$ denotes a maximum wheel speed that the skid recovery system 170 can compute based on one or more factors, such as engineering design preference, physically achievable drive power/torque of the vehicle, etc. In one or more embodiments, the skid recovery system 170 can dynamically determine $\omega_{max}$ depending on one or more states of the vehicle 100.

In implementing a positive wheel slip intervention the skid recovery system 170 can determine corresponding angle $\zeta$ limits associated with control of the wheel speed $\omega$ as:

$$\text{sgn}(\beta_F)\zeta_0 < \text{sgn}(\beta_F)\zeta < \text{sgn}(\beta_F)\zeta_{max} \qquad \text{Eq. 11}$$

where $\zeta_{max}$ is the angle value associated with $\omega_{max}$.

Thus, when the vehicle 100 is in a spin with insufficient counter-steer situation, the disclosed skid recovery system 170 can intervene to change the direction of the force vector $F_y$ from the front tire (e.g., by applying a negative or positive wheel slip intervention), and in so doing reduce a component of the force that is directed in a direction to worsen the skid, thereby changing a direction of lateral forces at the front wheels of the vehicle 100.

In one or more embodiments, prior to selecting and executing an intervention the skid recovery system 170 can determine potential effectiveness of different interventions. The skid recovery system 170 can then determine whether to intervene and which intervention to apply based on respective effectiveness determinations.

To determine effectiveness, the skid recovery system 170 can compute a proportion $\hat{Y}$ of the scalar saturated tire force perpendicular to the car body as a function of sideslip $\beta$ and angle $\zeta$:

$$\hat{Y} = \sin(\zeta - \text{sgn}(\beta)\pi) \qquad \text{Eq. 12}$$

The skid recovery system 170 can define an effectiveness coefficient $\Delta$ that describes the effectiveness of a given intervention (e.g., positive wheel slip intervention, negative wheel slip intervention) as the difference between the proportion of the force in a direction to oppose the skid, with and without the intervention:

$$\Delta = \text{sgn}(\beta)(\hat{Y}_{intervention} - \hat{Y}_0) \qquad \text{Eq. 13}$$

where $\hat{Y}_{intervention}$ denotes $\hat{Y}$ as calculated with the intervention, and $\hat{Y}_0$ denotes $\hat{Y}$ as calculated without intervention, i.e., in a free-rolling state with $\zeta = \zeta_0$ and $\omega = \omega_{freerolling}$. The skid recovery system 170 can determine that the intervention is effective if the effectiveness coefficient $\Delta$ exceeds a threshold. For example, as a default setting the skid recovery system 170 can determine that an intervention is effective when $\Delta > 0$.

Based on Equations 12 and 13, the skid recovery system 170 can determine whether a subset of achievable $\zeta$ and corresponding wheel speeds $\omega$ that improves skid recovery exists. If so, the skid recovery system may choose to activate the intervention.

In one or more embodiments, the skid recovery system 170 can further use secondary factors to determine whether to execute a given intervention. For example, the skid recovery system 170 can determine an effect of the intervention on vehicle speed, or in the case of advanced driver assistance systems with obstacle/lane detection (or the availability of environmental sensor data), the skid recovery system 170 can determine vehicle trajectory and obstacle avoidance and determine whether the intervention will increase/decrease a likelihood of a collision.

In one or more embodiments, the skid recovery system 170 can determine the magnitude of the intervention in any number of ways, including control theory, predictive control, or on-off control. To activate the intervention, the skid recovery system 170 can implement a closed-loop or open-loop intervention technique. For example, in a closed-loop implementation of an intervention, the skid recovery system 170 can use an appropriate actuator to close the loop around $\omega$. The skid recovery system 170 may implement an open-loop in some cases, e.g., in extreme interventions of maximum braking to lock the wheels or maximum drive torque for as quick a recovery as possible, especially considering the drivetrain delays and dynamics.

Accordingly, the disclosed skid recovery system 170 can detect when the vehicle 100 is in a spin with insufficient counter-steer condition, determine whether an intervention that induces slippage in the front wheels can be effective in aiding recovery, and, when appropriate, select and execute an intervention to change a direction of lateral forces at the front wheels to recover from the skid. Additional and optional features of the skid recovery system 170 and example methods of implementation will be discussed below.

Figure 6:
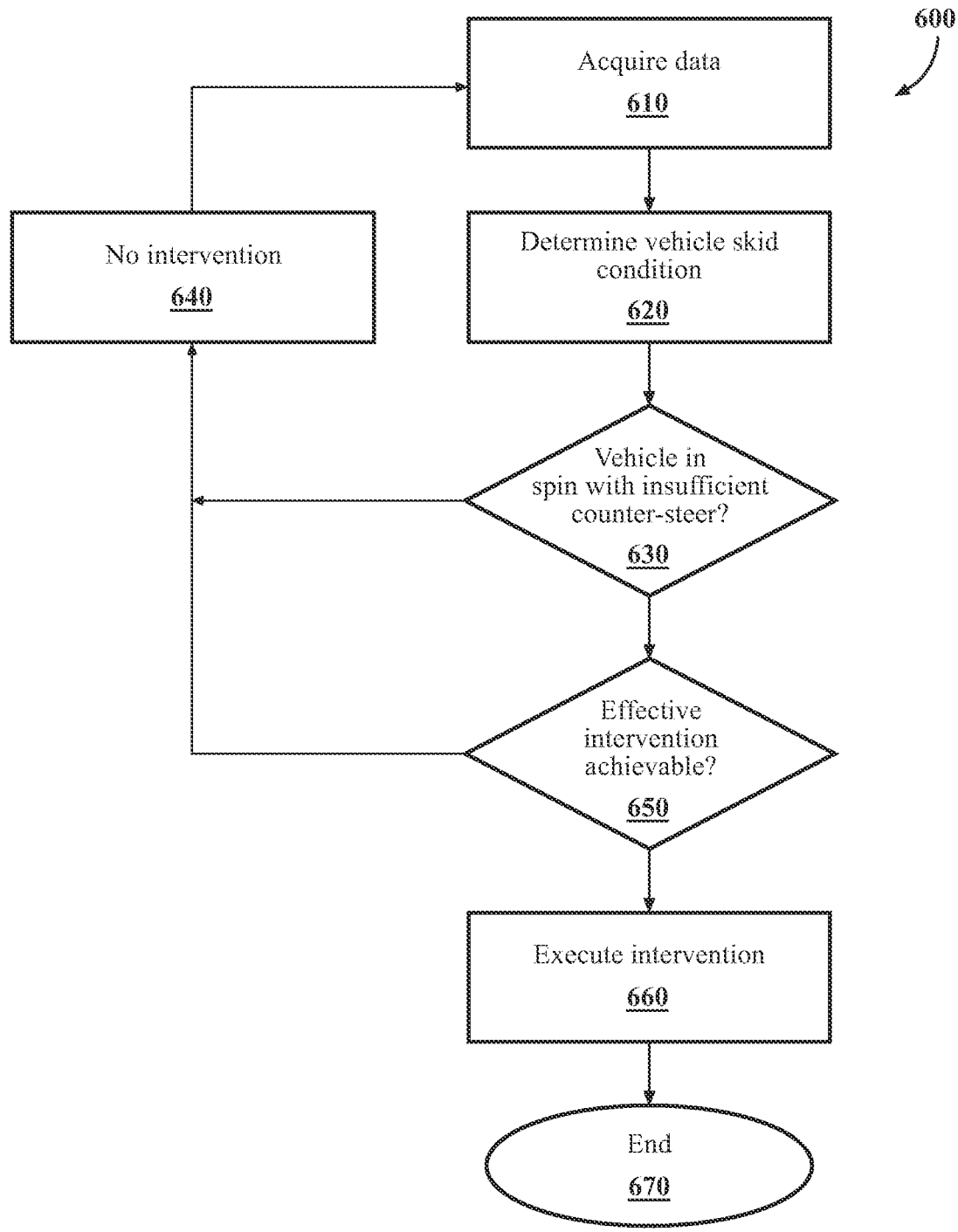
FIG. 6 illustrates an example flowchart of operations of a skid recovery system, according to the disclosed embodiments.

FIG. 6 illustrates a flowchart of a method 600 of executing skid recovery according to the disclosed embodiments. Method 600 will be discussed from the perspective of the skid recovery system 170 of FIGS. 1 and 2. While method 600 is discussed in combination with the skid recovery system 170, it should be appreciated that the method 600 is also not limited to being implemented within the skid recovery system 170 but is instead one example of a system that may implement the method 600.

At operation 610, the skid recovery system 170 (e.g., detection module 220) obtains data that can be used for determining one or more aspects of a skid condition of the vehicle 100. For example, in one or more embodiments the detection module 220 obtains sensor data 240 generated by the environment sensor(s) 122 and vehicle state data 250 generated by vehicle systems 140. The detection module 220 identifies and processes relevant samples that indicate a skid condition of the vehicle 100 and stores the information as skid condition data 260. Here, processing can refer to executing calculations and/or algorithms to derive information from the data samples, such as calculating a yaw rate (actual/intended), slip angle, etc.

At operation 620, the skid recovery system 170 (e.g., detection module 220) determines a skidding condition of the vehicle 100. For example, based on the obtained data, the detection module 220 can determine one or more measurable parameters of the skid condition, such as velocity vector components, steering angle, sideslip, etc., as discussed above.

At operation 630, the skid recovery system 170 (e.g., detection module 220) determines whether the vehicle 100 is in a spin with insufficient counter steering condition. For example, in one or more embodiments the detection module 220 can determine that the vehicle 100 is in a skid condition that cannot be corrected by counter-steering based at least in part on a comparison of a threshold value against a difference between an angle of velocity at the front wheels and a current steering angle of the front wheel.

At operation 640, when the vehicle 100 is not in a spin with insufficient counter steering condition, the skid recovery system 170 forgoes executing an intervention and proceeds to continue to acquire and monitor data.

At operation 650, the skid recovery system 170 (e.g., intervention module 230) can determine whether an effective intervention is achievable. For example, in one or more embodiments the intervention module 230 can determine an effectiveness coefficient corresponding to each of a plurality of different interventions. The intervention module 230 can select the intervention, from among the plurality of different interventions, based at least in part on the effectiveness coefficient of the intervention.

In another example, in one or more embodiments the skid recovery system 170 (e.g., intervention module 230) can determine vehicle trajectory predictions associated with a plurality of different interventions and select the intervention from among the plurality of different interventions based at least in part on whether the vehicle trajectory prediction associated with the intervention indicates a likelihood of a collision of the vehicle 100.

Figure 7:
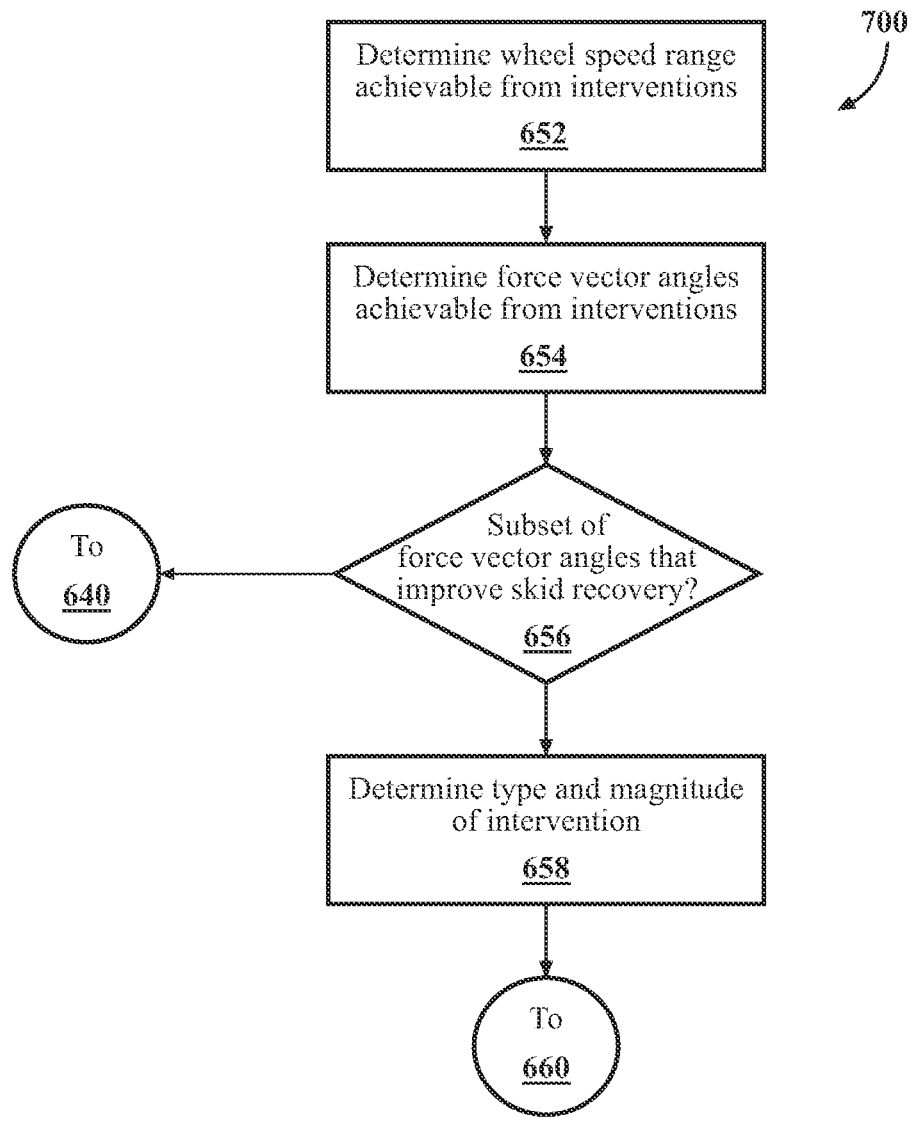
FIG. 7 illustrates an example flowchart of operations of a skid recovery system determining parameters for intervention, according to the disclosed embodiments.

Furthermore, in one or more embodiments the intervention module 230 can execute operations as shown in the flowchart 700 illustrated in FIG. 7 to determine parameters for an intervention as part of determining whether an effective intervention is possible.

At operation 652, the intervention module 230 can determine a range of front wheel speeds achievable from a particular intervention type (e.g., positive wheel slip intervention, negative wheel slip intervention).

At operation 654, the intervention module 230 can determine a range of achievable front wheel sliding force vector angles.

At operation 656, the intervention module 230 can determine whether a subset of achievable sliding force vector angles exists that improve skid recovery, for example, based on Equations 12 and 13 as discussed above. In one or more embodiments, when the intervention module 230 does not identify a subset of achievable sliding force vector angles that improve skid recovery, the skid recovery system 170 can forgo intervention (i.e., proceed to operation 640).

When the intervention module 230 identifies a subset of achievable sliding force vector angles exists that improves skid recovery, in one or more embodiments the intervention module 230 can determine a type and magnitude of intervention at operation 658. The skid recovery system 170 can then proceed to operation 660, i.e., execute the intervention. For example, in one or more embodiments the intervention module 230 can actuate vehicle components (e.g., brakes, throttle, etc.) to control a wheel speed in accordance with the intervention that is determined to change a direction and/or magnitude of lateral forces at the front wheels in a manner that achieves or at least improves skid recovery. The process ends at 670.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area. In one or more embodiments, the detection module 220 can determine that a hazard state exists based on a predicted trajectory of the vehicle 100 intersecting with a static obstacle represented in the static obstacle map(s) 118 beyond a threshold amount that indicates a likelihood of a collision between the vehicle 100 and the static obstacle.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles) and store the data as sensor data 240.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above (e.g., wheel speed, yaw rate, other factors related to a skid condition, etc.). In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the skid recovery system 170, and/or the autonomous driving module(s) 160 can be operatively connected to communicate with the various vehicle systems 140 and/or individual components thereof. For example, returning to FIG. 1, the processor(s) 110, the skid recovery system 170, and/or the autonomous driving module(s) 160 can be in communication to send and/or receive information from the various vehicle systems 140 to control the movement, speed, maneuvering, heading, direction, etc. of the vehicle 100. The processor(s) 110, the skid recovery system 170, and/or the autonomous driving module(s) 160 may control some or all of these vehicle systems 140 and, thus, may be partially or fully autonomous.

The processor(s) 110, the skid recovery system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110, the skid recovery system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. The skid recovery system 170 can determine one or more actuation commands for one or more of the actuators 150, e.g., to control the clutch, brakes and/or throttle, as discussed above.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the skid recovery system 170 can be configured to determine travel path(s) and determine current autonomous driving maneuvers for the vehicle 100, future autonomous driving maneuvers and/or modifications to current autonomous driving maneuvers based on data acquired by the sensor system 120 and/or skid recovery system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, a, 5B, 5C, 6, and 7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A skid recovery system for a vehicle, comprising:
   a processor; and
   a memory, communicably connected to the processor, storing:
      a detection module including instructions that, when executed by the processor, cause the processor to determine whether a skid condition of the vehicle, indicated by sensor data generated by a sensor, is correctable by counter-steering; and
      an intervention module including instructions that, when executed by the processor, cause the processor to:
         determine parameters for an intervention by determining a subset of achievable sliding force vector angles that improve skid recovery, wherein a sliding force vector angle is an arctangent of a ratio of a first difference divided by a second difference, the first difference is a first product subtracted from a lateral component of a vehicle body travel velocity, the second difference is a second product subtracted from a longitudinal component of the vehicle body travel velocity, the first product is a radius of a tire multiplied by a wheel speed multiplied by a sine of a steering angle, and the second product is the radius of the tire multiplied by the wheel speed multiplied by a cosine of the steering angle; and
         execute the intervention in response to a determination that the skid condition is not correctable by counter-steering, the intervention including inducing slippage in front wheels of the vehicle to change a direction and/or magnitude of lateral forces at the front wheels, wherein the direction of the lateral forces at the front wheels is a function of the sliding force vector angle.

2. The skid recovery system of claim 1, wherein the instructions to determine whether the skid condition is correctable include instructions to determine that the skid condition is not correctable by counter-steering based at least in part on comparing a threshold value against a difference between an angle of velocity at the front wheels and a current steering angle of the front wheels.

3. The skid recovery system of claim 1, wherein the intervention includes inducing slippage in the front wheels by decreasing spinning speed of the front wheels.

4. The skid recovery system of claim 1, wherein the intervention includes inducing slippage in the front wheels by increasing spinning speed of the front wheels.

5. The skid recovery system of claim 1, wherein the intervention module further includes instructions to:
   determine an effectiveness coefficient corresponding to each of a plurality of different interventions prior to executing the intervention; and
   select the intervention from among the plurality of different interventions based at least in part on an associated effectiveness coefficient of the intervention.

6. The skid recovery system of claim 1, wherein the instructions to determine the parameters for the intervention further include instructions to determine the parameters for the intervention by:
   determining a range of front wheel speeds achievable from a particular intervention type;
   selecting a type of intervention based on the subset; and
   determining a magnitude of the type of intervention selected.

7. The skid recovery system of claim 1, wherein the intervention module further includes instructions to:
   determine, prior to executing the intervention, a vehicle trajectory prediction associated with a plurality of different interventions; and
   select the intervention from among the plurality of different interventions based at least in part on whether the vehicle trajectory prediction associated with the intervention indicates a likelihood of a collision of the vehicle.

8. A method for controlling a vehicle during a skid, comprising:
   obtaining data indicating a skid condition of the vehicle;
   determining whether the skid condition is correctable by counter-steering;
   determining parameters for an intervention by determining a subset of achievable sliding force vector angles that improve skid recovery, wherein a sliding force vector angle is an arctangent of a ratio of a first difference divided by a second difference, the first difference is a first product subtracted from a lateral component of a vehicle body travel velocity, the second difference is a second product subtracted from a longitudinal component of the vehicle body travel velocity, the first product is a radius of a tire multiplied by a wheel speed multiplied by a sine of a steering angle, and the second product is the radius of the tire multiplied by the wheel speed multiplied by a cosine of the steering angle; and
   executing the intervention in response to a determination that the skid condition is not correctable by counter-steering, the intervention including inducing slippage in front wheels of the vehicle to change a direction and/or magnitude of lateral forces at the front wheels, wherein the direction of the lateral forces at the front wheels is a function of the sliding force vector angle.

9. The method of claim 8, further comprising determining that the skid condition is not correctable by counter-steering based at least in part on a comparison of a threshold value against a difference between an angle of velocity at the front wheels and a current steeling angle of the front wheels.

10. The method of claim 8, wherein the intervention includes inducing slippage in the front wheels by decreasing spinning speed of the front wheels.

11. The method of claim 8, wherein the intervention includes inducing slippage in the front wheels by increasing spinning speed of the front wheels.

12. The method of claim 8, further comprising:
determining an effectiveness coefficient for each of a plurality of different interventions prior to executing the intervention; and
selecting the intervention from among the plurality of different interventions based at least in part on an associated effectiveness coefficient of the intervention.

13. The method of claim 8, wherein the determining the parameters for the intervention further comprises determining the parameters for the intervention by:
determining a range of front wheel speeds achievable from a particular intervention type;
selecting a type of intervention based on the subset; and
determining a magnitude of the type of intervention selected.

14. The method of claim 8, further comprising:
determining, prior to executing the intervention, vehicle trajectory predictions associated with a plurality of different interventions; and
selecting the intervention from among the plurality of different interventions based at least in part on whether the vehicle trajectory prediction associated with the intervention indicates a likelihood of a collision of the vehicle.

15. A non-transitory computer-readable medium for controlling a vehicle during a skid, including instructions that, when executed by one or more processors, cause the one or more processors to:
obtain data indicating a skid condition of the vehicle;
determine whether the skid condition is correctable by counter-steering;
determine parameters for an intervention by determining a subset of achievable sliding force vector angles that improve skid recovery, wherein a sliding force vector angle is an arctangent of a ratio of a first difference divided by a second, difference, the first difference is a first product subtracted from a lateral component of a vehicle body travel velocity, the second difference is a second product subtracted from a longitudinal component of the vehicle body travel velocity, the first product is a radius of a tire multiplied by a wheel speed multiplied by a sine of a steering angle, and the second product is the radius of the tire multiplied by the wheel speed multiplied by a cosine of the steering angle; and
execute the intervention in response to a determination that the skid condition is not correctable by counter-steering, the intervention including inducing slippage in front wheels of the vehicle to change a direction and/or magnitude of lateral forces at the front wheels, wherein the direction of the lateral forces at the front wheels is a function of the sliding force vector angle.

16. The non-transitory computer-readable medium of claim 15, further comprising instructions to determine that the skid condition is not correctable by counter-steering based at least in part on a comparison of a threshold value against a difference between an angle of velocity at the front wheels and a current steering angle of the front wheels.

17. The non-transitory computer-readable medium of claim 15, wherein the intervention includes slippage in the front wheels by decreasing spinning speed of the front wheels.

18. The non-transitory computer-readable medium of claim 15, wherein the intervention includes slippage in the front wheels by increasing spinning speed of the front wheels.

19. The non-transitory computer-readable medium of claim 15, further comprising instructions to:
determine an effectiveness coefficient for each of a plurality of different interventions prior to executing the intervention; and
select the intervention from among the plurality of different interventions based at least in part on an associated effectiveness coefficient of the intervention.

20. The non-transitory computer-readable medium of claim 15, wherein the instructions to determine the parameters for the intervention further include instructions to determine the parameters for the intervention by:
determine a range of front wheel speeds achievable from a particular intervention type;
select a type of intervention based on the subset; and
determine a magnitude of the type of intervention selected.

21. A system, comprising:
a processor; and
a memory storing a module including instructions that cause the processor to:
determine that a vehicle skid condition is uncorrectable by counter-steering;
determine, for skid recovery, a sliding force vector angle that is an arctangent of a ratio of a first difference divided by a second difference, the first difference being a first product subtracted from a lateral component of a vehicle body travel velocity, the second difference being a second product subtracted from a longitudinal component of the vehicle body travel velocity, the first product being a tire radius multiplied by a wheel speed multiplied by a sine of a steering angle, and the second product being the tire radius multiplied by the wheel speed multiplied by a cosine of the steering angle; and
execute, for skid recovery, an intervention that is a function of the sliding force vector angle.

\* \* \* \* \*